United States Patent
Rao et al.

(10) Patent No.: US 9,140,937 B2
(45) Date of Patent: Sep. 22, 2015

(54) DISPLAY PANEL

(71) Applicants: Industrial Technology Research Institute, Hsinchu (TW); University of Central Florida Research Foundation Inc., Orlando, FL (US)

(72) Inventors: Ling-hui Rao, Orlando, FL (US); Shin-Tson Wu, Orlando, FL (US); Yu-Cheng Lai, Taichung (TW)

(73) Assignees: Industrial Technology Research Institute, Hsinchu (CN); University of Central Florida Research Foundation, Inc., Orlando, FL (US)

( * ) Notice: Subject to any disclaimer, the term of this patent is extended or adjusted under 35 U.S.C. 154(b) by 375 days.

(21) Appl. No.: 13/723,161

(22) Filed: Dec. 20, 2012

(65) Prior Publication Data

US 2014/0176837 A1 Jun. 26, 2014

(51) Int. Cl.
*G02F 1/1335* (2006.01)
*G02F 1/1343* (2006.01)

(52) U.S. Cl.
CPC ...... *G02F 1/134336* (2013.01); *G02F 1/13439* (2013.01)

(58) Field of Classification Search
CPC .......... G02F 1/134363; G02F 1/13439; G02F 1/134336
See application file for complete search history.

(56) References Cited

U.S. PATENT DOCUMENTS

| | | | |
|---|---|---|---|
| 7,342,632 B2 | 3/2008 | Miyachi et al. | |
| 7,724,335 B2 | 5/2010 | Miyachi et al. | |
| 7,843,504 B2 | 11/2010 | Lee | |
| 8,120,746 B2 | 2/2012 | Shibahara et al. | |
| 2005/0259207 A1* | 11/2005 | Yang et al. | 349/141 |
| 2009/0310069 A1 | 12/2009 | Do et al. | |
| 2010/0302492 A1 | 12/2010 | Kubota et al. | |
| 2011/0075074 A1* | 3/2011 | Gauza et al. | 349/96 |
| 2011/0122332 A1* | 5/2011 | Kubota et al. | 349/44 |

(Continued)

FOREIGN PATENT DOCUMENTS

| | | |
|---|---|---|
| CN | 1828373 | 9/2006 |
| JP | 2001337339 | 12/2001 |
| TW | 201122648 | 7/2011 |

OTHER PUBLICATIONS

Yan Li, et al., "Transmissive and Transflective Blue-Phase LCDs With Enhanced Protrusion Electrodes", IEEE, Journal of Display Technology, vol. 7, No. 7, Jul. 2011, pp. 359-361.

(Continued)

*Primary Examiner* — Michael Caley
*Assistant Examiner* — Edmond Lau
(74) *Attorney, Agent, or Firm* — Jianq Chyun IP Office (57) ABSTRACT

A display panel includes a first substrate, a second substrate, a liquid crystal layer interposed between the first substrate and the second substrate, a color filter layer, a first pixel unit, a second pixel unit, and a third pixel unit. The liquid crystal layer includes optically isotropic liquid crystals. The first pixel unit, the second pixel unit and the third pixel unit form a first electric field, a second electric field and a third electric filed in the liquid crystal layer. A first display light, a second display light and a third display light displayed by the first pixel unit, the second pixel unit and the third pixel unit have different wavelengths. The first electric field, the second electric field and the third electric field are different when the first pixel unit, the second pixel unit and the third pixel unit are applied by a same driving voltage set.

25 Claims, 7 Drawing Sheets

(56) References Cited

U.S. PATENT DOCUMENTS

2011/0317106 A1* 12/2011 Saito .............................. 349/106
2013/0050629 A1* 2/2013 Kang ............................. 349/144
2013/0154911 A1* 6/2013 Chen et al. ....................... 345/87

OTHER PUBLICATIONS

Linghui Rao, et al., "Low voltage blue-phase liquid crystal displays", Applied Physics Letters 95, 2009, pp. 231101-1-231101-3.

Linghui Rao, et al., "Low Voltage Blue-Phase LCDs With Double-Penetrating Fringe Fields", Journal of Display Technology, vol. 6, No. 8, Aug. 2010, pp. 287-289.

Zhibing Ge, et al., "Electro-optics of polymer-stabilized blue phase liquid crystal displays", Applied Physics Letters 94, 2009, pp. 101104-1-101104-3.

Linghui Rao, et al., "Emerging Liquid Crystal Displays Based on the Kerr Effect", Mol. Cryst. Liq. Cryst., vol. 527, 2010, pp. 186-198.

Yan Li, et al., "Blue-Phase LCDs with Double-side Protrusion Electrodes", J. of display technology 4, 2009, pp. 1-3.

Meizi Jiao, et al., "Dispersion relation on the Kerr constant of a polymer-stabilized optically isotropic liquid crystal", Physical Review E 83, 2011, pp. 041706-1-041706-4.

Linghui Rao, et al., "A large Kerr constant polymer-stabilized blue phase liquid crystal", Applied Physics Letters 98, 2011, pp. 081109-1-081109-3.

S. Meiboom, et al., "Theory of the blue phase of Cholesteric Liquid Crystals", Physical Review Letters, vol. 46, No. 8, May 1981, pp. 1216-1219.

Hirotsugu Kikuchi, et al., "Polymer-stabilized liquid crystal blue phases", Nature Materials, vol. 1, Sep. 2002, pp. 64-68.

Hui-Chuan Cheng, et al., "Vertical field switching for blue-phase liquid crystal devices", Applied Physics Letters 98, 2011, pp. 261102-1-261102-3.

Yasuhiro Haseba, et al., "Large electro-optic Kerr effect in nanostructured chiral liquid-crystal composites over a wide temperature range", Advanced Materials 17, 2005, pp. 2311-2315.

"Office Action of Taiwan Counterpart Application", issued on Mar. 10, 2015, p. 1-p. 18, in which the listed references were cited.

* cited by examiner

DISPLAY PANEL

TECHNICAL FIELD

The present disclosure is related to a liquid crystal display.

BACKGROUND

The thin-film-transistor liquid crystal display (TFT-LCD) industry has now dominated the flat panel display market. Generally, in a typical liquid crystal display (LCD), the liquid crystal layer is disposed between two glass substrates and the plural pixel units with switching thin-film-transistors (TFTs) are formed on the inner surface of one substrate to provide driving voltages. The liquid crystal (LC) cell together with the polarizers functions like a light valve to modulate amplitude for different grey levels. The LCD technology is fairly mature as the issues of viewing angle, color gamut, power consumption, and contrast ratio have been improved a lot. The response time is been improved to 2-5 ms (mini seconds) by using low viscosity LC materials and thinner cell gap fabrication techniques. However, to reduce the motion image blur, a faster molecular response is needed.

Recently, a blue-phase liquid crystal (BPLC) has been developed; it has a fast response time within submillisecond. In comparison to conventional nematic LCDs, the blue-phase LCD exhibits at least four features: 1) it does not require any alignment layer, such as polyimide, which not only simplifies the manufacturing processes but also reduces the cost; 2) its response time is in the submillisecond range, which helps to minimize the motion-image blur; 3) the dark state of the blue-phase LCD is optically isotropic so that its viewing angle is wide and symmetric, in which optical compensation films may or may not be needed, depending on the actual applications; 4) in an in-plane switching (IPS) like structure, the transmittance is insensitive to the cell gap, as long as the cell gap exceeds 2-3 μm depending on the birefringence of the LC composite employed. This cell-gap insensitivity is particularly attractive for fabricating large-panel or single-substrate LCDs, in which cell-gap uniformity is a big concern.

Blue-phase liquid crystal exists in a very narrow temperature range (1~2° C.) between chiral nematic and isotropic phase; its molecular structure is comprised of double-twisted cylinders arranged in a cubic lattice with periods of ~100 nm [Meiboom, et al., Theory of the blue phase of cholesteric liquid crystals, Phys. Rev. Lett. 46, 1216-1219 (1981)]. Blue-phase liquid crystals have been studied for several decades; however their mesogenic temperature range is too narrow for any practical applications. With the polymer-stabilization method, the mesogenic temperature range of blue phase can be widened, covering the room temperature [H. Kikuchi, et al., Polymer-stabilized liquid crystal blue phases, Nature Materials 1, 64-68 (2002)]. In the voltage-off state, blue-phase liquid crystal appears optically isotropic. As the voltage increases, based on Kerr effect, the LC refractive index distribution becomes anisotropic. The induced birefringence $\Delta n$ is proportional to the incident wavelength $\lambda$, the Kerr constant K, and the square of the applied electric field E as $\Delta n = \lambda K E^2$. The induced $\Delta n$ appears to change the blue-phase liquid crystal from the sphere into an ellipsoid like a uniaxial medium where the optic axis is along the electric field vector. In the IPS based electrode structure, the electric field in the direction parallel to the substrate is preferred so that the induced birefringence $\Delta n$ will be along the horizontal direction that is parallel to the polarizer surface plane. For a transmissive display, when the device is interposed between two crossed polarizers, the transmittance increases gradually as the voltage increases. [Z. Ge, et al. Electro-optics of polymer-stabilized blue phase liquid crystal displays, Appl. Phys. Lett. 94, 101104 (2009); L. Rao, et al., Emerging liquid crystal displays based on the Kerr effect, Mol. Cryst. Liq. Cryst., 527, 186-198 (2010)]. Generally, for a uniaxial medium placed between two crossed linear polarizers, the output transmission is $T = T_0 \sin(2\phi)^2 \sin(\delta/2)^2$, where $\phi$ is the angle between optic axis of the uniaxial media and the absorption axis of the polarizer, $\delta = 2\pi d \Delta n / \lambda$ is the phase retardation of the uniaxial medium. Thus, $\phi$ needs to be 45° away from the linear polarizer's absorption axis. In other words, the induced birefringence $\Delta n$ also needs to be along that direction to have maximum transmittance. Besides, the induced birefringence $\Delta n$ should also be parallel to the substrate surface to have a maximum $\delta$. For vertical field switching, to gain the phase retardation, the incident light direction should not be parallel to the field direction. [H. C. Cheng, J. Yan, T. Ishinabe, and S. T. Wu, Vertical field switching for blue-phase liquid crystal devices, Appl. Phys. Lett. 98, 261102 (2011).] Aside from blue-phase liquid crystal, other types of optically isotropic liquid crystal, e.g. polymer stabilized isotropic phase (PSIP) liquid crystal, is reported with similar electro-optic properties. [Y. Haseba, et al. Large electro-optic Kerr effect in nanostructured chiral liquid-crystal composites over a wide temperature range, Adv. Mater. 17, 2311 (2005)].

For blue-phase liquid crystals, or more generally the optically isotropic liquid crystals, the Kerr constant K is wavelength dependent. The Kerr constant decreases with the increment of the wavelength. [L. Rao, et al., "Emerging liquid crystal displays based on the Kerr effect", Mol. Cryst. Liq. Cryst., 527, 186-198 (2010); M. Jiao, et al., "Dispersion relation on the Kerr constant of a polymer-stabilized optically isotropic liquid crystal," Phys. Rev. E 83, 041706 (2011).] Therefore, the voltage-transmittance curves for red, blue and green three colors will not overlap.

Figure 1A:
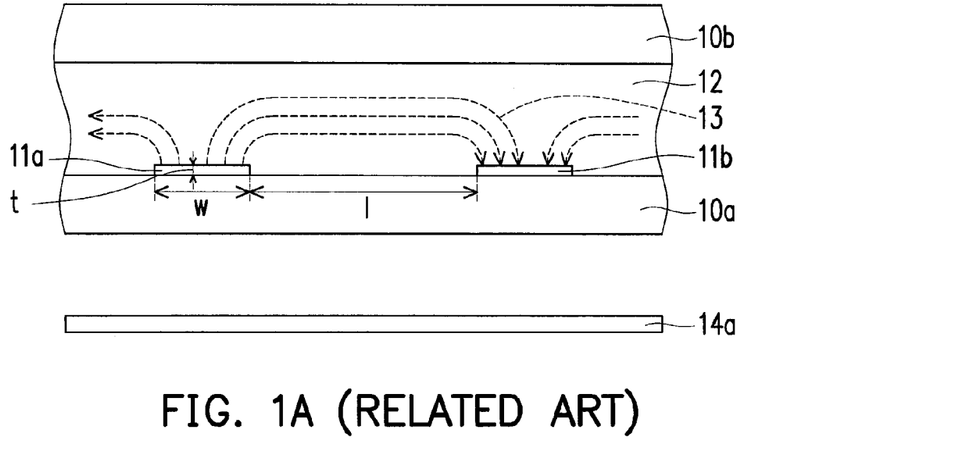
FIG. 1A is a schematic diagram illustrating a blue-phase liquid crystal display equipped with the IPS driving electrode according to a related art.
Figure 1B:
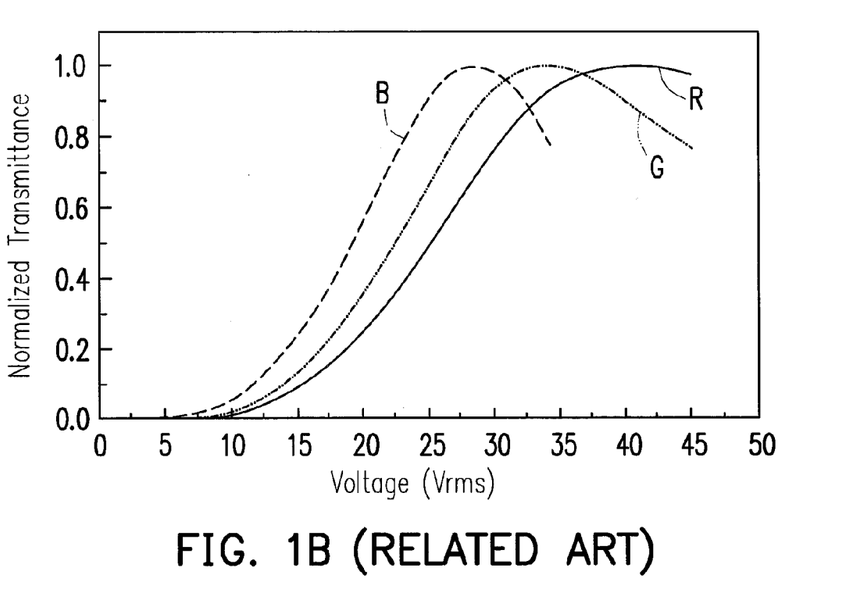
FIG. 1B shows the VT curves of red, green and blue three colors of a blue-phase liquid crystal display equipped with the IPS driving electrodes having an electrode width w of 2 μm and gap 1 of 5 μm.

A known IPS electrode driven BPLCD is shown in FIG. 1A, where a blue-phase liquid crystal layer 12 is inserted between two glass substrates 10a and 10b, and a pixel electrode 11a and a common electrode 11b are both formed on the bottom substrate 10a. Typically, the polarizers 14a and 14b interpose the substrates 10a and 10b and the blue-phase liquid crystal layer 12 therebetween. The electrodes 11a and 11b are made of metal or indium tin oxide (ITO) in a stripe shape, and the stripe width w is around 3 to 10 μm and the spacing l between two electrodes 11a and 11b is about 6 to 20 μm. In the related art, the thickness t of the metal or ITO electrodes 11a and 11b in the stripe shape are typically below 150 nm. And this low stripe electrode height confines the strong electric fields (as shown by the dash lines 13 in FIG. 1A) to mainly distribute near the bottom substrate surface. As shown in FIG. 1B, the dispersion for V-T (voltage versus normalized transmittance) curves R, G and B of red, green and blue three colors is quite severe, in which the IPS structure here has an electrode width w of 2 μm and gap l of 5 μm.

SUMMARY

A display panel is introduced herein, which includes a first substrate, a second substrate, a liquid crystal layer, a color filter layer, at least a first pixel unit, at least a second pixel unit, and at least a third pixel unit. The second substrate is opposite to the first substrate. The liquid crystal layer is interposed between the first substrate and the second substrate, and includes a plurality of optically isotropic liquid crystals. The color filter layer is disposed between the second substrate and the liquid crystal layer. The first pixel unit is disposed between the first substrate and the second substrate to form a first electric field in the liquid crystal layer and the first pixel unit includes a first electrode set. The second pixel unit is disposed between the first substrate and the second substrate to form a second electric field in the liquid crystal layer and the second pixel unit includes a second electrode set. The third pixel unit is disposed between the first substrate and the second substrate to form a third electric field in the liquid crystal layer and the third pixel unit includes a third electrode set. A first display light displayed by the first pixel unit, a second display light displayed by the second pixel unit and a third display light displayed by the third pixel unit have different wavelengths to display an image. The first electric field, the second electric field and the third electric field are different when the first electrode set, the second electrode set and the third electrode set are applied by a same driving voltage set.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Before explaining the disclosed embodiments of the present disclosure in detail it is to be understood that the disclosure is not limited in its application to the details of the particular arrangements shown since the disclosure is capable of other embodiments. Also, the terminology used herein is for the purpose of description and not of limitation. The method and device of the embodiments of present disclosure disclose a design for producing a fast response LCD device with single gamma curve driving. The embodiments of the present disclosure will be described with reference to the attached drawings.

Figure 2:
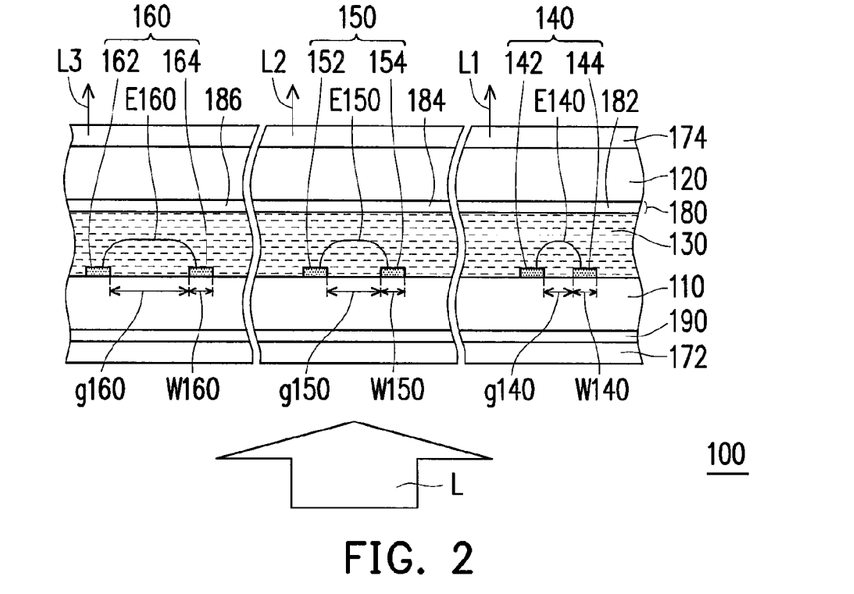
FIG. 2 is a schematic diagram illustrating a display panel according to an embodiment.

An embodiment provides a display panel as shown in FIG. 2. The display panel 100 according to the embodiment includes a first substrate 110, a second substrate 120, a liquid crystal layer 130, a first pixel unit 140, a second pixel unit 150, a third pixel unit 160, a first polarizer 172, a second polarizer 174, a color filter layer 180 and an optical retardation compensator 190. Herein, the first substrate 110 and the second substrate 120 are configured opposite to each other so that the liquid crystal layer 130 is interposed between the first substrate 110 and the second substrate 120. The first pixel unit 140, the second pixel unit 150 and the third pixel unit 160 are disposed between the first substrate 110 and the second substrate 120 and substantially formed on the first substrate 110 for driving the liquid crystals in the liquid crystal layer 130. In other words, the first pixel unit 140, the second pixel unit 150 and the third pixel unit 160 are disposed between the first substrate 110 and the liquid crystal layer 130, but the disclosure is not limited thereto. In addition, the first polarizer 172 and the second polarizer 174 are configured for sandwiching the cell constructed by the first substrate 110, the liquid crystal layer 130 and the second substrate 120 therebetween. The color filter layer 180 can be disposed on the second substrate 120 and located between the second substrate 120 and the liquid crystal layer 130. As such, a white light L incident to the liquid crystal layer 130 from the first substrate 110 can be transformed into the first display light L1, the second display light L2 and the third display light L3 and the three display lights can emit out from the second substrate 120 for displaying an image. The optical retardation compensator 190 can be located between the first polarizer 172 and the second polarizer 174 and substantially disposed between the first substrate 110 and the first polarizer 172.

In the present embodiment, the first pixel unit 140 can include an electrode set of the electrodes 142 and 144 disposed on the first substrate 110, the second pixel unit 150 can include an electrode set of the electrodes 152 and 154 disposed on the first substrate 110, and the third pixel unit 160 can include an electrode set of the electrodes 162 and 164 on the first substrate 110. In an example, each of the first pixel unit 140, the second pixel unit 150 and the third pixel unit 160 can include at least one active device such as a thin film transistor (not shown) to connect with the electrodes. Taking the first pixel unit 140 having one active device as an example, one of the electrodes 142 and 144 in the first pixel unit 140 can be connected to the active device to receive the pixel voltage and the other is connected to a common voltage. Alternately, the electrodes 142 and 144 are respectively connected to two active devices to receive the first pixel voltage and the second pixel voltage when the first pixel unit 140 having two active devices is taken as an example. As for the other two pixel units 150 and 160, similar design can be utilized.

As shown in FIG. 2, the electrodes 142 and 144, the electrodes 152 and 154, and the electrodes 162 and 164 are all formed on the first substrate 110 to construct the IPS configuration. When the display panel 100 is turned-on, the electrodes in each electrode set can be respectively applied by a set of driving voltages to form an electric field in the liquid crystal layer 130 with a main vector parallel to the first substrate 110 or the second substrate 120. Namely, for forming the driving electric field in the liquid crystal layer 130, the electrodes 142 and 144 of the first electrode set can be applied by different voltages, the electrodes 152 and 154 of the second electrode set can be applied by different voltages and the electrodes 162 and 164 of the third electrode set can be applied by different voltages.

In addition, for the display panel 100 displaying color images, a first display light L1 displayed by the first pixel unit 140, a second display light L2 displayed by the second pixel unit 150 and a third display light L3 displayed by the third pixel unit 160 can have different colors, i.e. different wavelengths. In an embodiment, the color filter layer 180 can include a first color filter pattern 182, a second color filter pattern 184 and a third color filter pattern 186 with different colors. The first color filter pattern 182, the second color filter pattern 184 and the third color filter pattern 186 can respectively be a red color filter pattern, a green color filter pattern and a blue color filter pattern so as to transform the incident white light L into the first display light L1, the second display light L2 and the third display light L3, in which the first display light L1 can be a red light, the second display light L2 can be a green light and the third display light L3 can be a blue light. However, the colors of the color filter patterns and the display lights L1, L2 and L3 are not limited herein, and the colors of the first, second and third display lights L1, L2 and L3 can be any visible color. For example, the colors of the display light can be yellow, violet, or other visible colors.

In the present embodiment, the liquid crystals in the liquid crystal layer 130 include the optically isotropic liquid crystals, such as blue-phase liquid crystal molecules, polymer-stabilized isotropic phase liquid crystal molecules, or a combination thereof. The first, second and third pixel units 140, 150 and 160 configured to have the IPS structure can provide the driving electric field having the main vector substantially parallel to the first substrate 110, the second substrate 120 or both. In general, owing to the wavelength dispersion effect of the liquid crystal layer 130, the transmittance of the first display light L1, the second display light L2 and the third display light L3 may be different under the same driving electric field. Therefore, the driving electric field formed in the liquid crystal layer 130 with respect to different display lights L1, L2 and L3 needs be modified and thus the first, second and third pixel units 140, 150 and 160 can have at least the following design.

Regarding to the electrode designs of the first pixel unit 140, the second pixel unit 150 and the third pixel unit 160, each of the electrodes 142, 144, 152, 154, 162 and 164 respectively can have a linear shape (including straight stripe shape, zigzag stripe shape, or the like) in a top view and the drawing of FIG. 2 exemplified shows a cross-sectional view taken long the width of the linear pattern. As shown in FIG. 2, a first gap g140 is formed between the electrically independent electrodes 142 and 144 of the first electrode set in the first pixel unit 140 and the electrodes 142 and 144 respectively have a width W140 of 0.2 μm to 100 μm. A second gap g150 is formed between the electrodes 152 and 154 of the second electrode set in the second pixel unit 150 and the electrodes 152 and 154 respectively have a width W150 of 0.2 μm to 100 μm. A third gap g160 is formed between the electrodes 162 and 164 of the third electrode set in the third pixel unit 160 and the electrodes 162 and 164 respectively have a width W160 of 0.2 μm to 100 μm. Herein, the first gap g140, the second gap g150 and the third gap g160 are configured in the size of greater than 0 μm to about 100 μm.

A first electric field E140, a second electric field E150 and a third electric field E160 formed in the liquid crystal layer 130 are related to several factors such as the sizes of the first gap g140, the second gap g150, and the third gap g160, the voltages applied to the electrodes 142 and 144, the electrodes 152 and 154 and the electrodes 162 and 164, and the shapes (including the widths, the height, or the like) of the electrodes 142, 144, 152, 154, 162 and 164. Therefore, as the sizes of the first gap g140, the second gap g150, and the third gap g160 are different, the first, second and third electric fields E140, E150 and E160 in the liquid crystal layer 130 can be different even though the voltage differences of the first pixel unit 140, the second pixel unit 150 and the third pixel unit 160 are the same. In the condition that the voltage differences applied to the electrodes 142 and 144, the electrodes 152 and 154 and the electrodes 162 and 164 are the same and the shapes of the electrodes are the same, the first, second and third electric fields E140, E150 and E160 formed in the liquid crystal layer 130 may increase when the first gap g140, the second gap g150, and the third gap g160 decreases.

In the present embodiment, the first gap g140 is smaller than the second gap g150 and the second gap g150 is smaller than the third gap g160 so that the first electric field E140, the second electric field E150 and the third electric field E160 are gradually decreased comparing to the former one when the electrodes 142, 152 and 162 are all applied by the same first voltage, and the electrodes 144, 154 and 164 are all applied by the same second voltage different from the first voltage. The inconsistence of the Kerr constant with respect to different wavelengths can be compensated by the inconsistence of the first, second and third electric fields E140, E150 and E160 such that the first display light L1, the second display light L2 and the third display light L3 can have similar normalized brightness under the same driving voltage set applied to the first pixel unit 140, the second pixel unit 150 and the third pixel unit 160. Herein the driving voltage set can include a pixel voltage and a common voltage different to the pixel voltage, or a first pixel voltage and a second pixel voltage different to the first pixel voltage.

Figure 3:
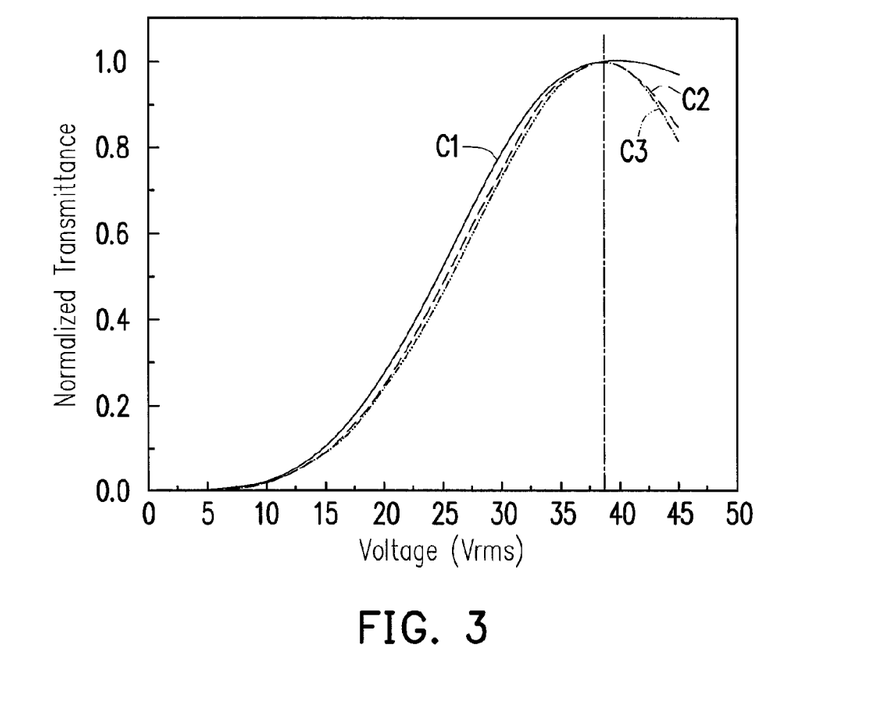
FIG. 3 shows the V-T curves of the first display light, the second display light and the third display light displayed by the first, the second and the third pixel units depicted in FIG. 2.

FIG. 3 shows the V-T curves of the first display light, the second display light and the third display light of the display panel 100 depicted in FIG. 2. Referring to FIG. 2 and FIG. 3, the curve C1 represents the V-T curve of the first display light L1 displayed by the first pixel unit 140 when the first display light L1 has a wavelength of 650 nm, i.e. has red color. The curve C2 represents the V-T curve of the second display light L2 displayed by the second pixel unit 150 when the second display light L2 has a wavelength of 550 nm, i.e. has green color. The curve C3 represents the V-T curve of the third display light L3 in FIG. 2 displayed by the third pixel unit 160 when the third display light L3 has a wavelength of 450 nm, i.e. has blue color. In addition, the voltage value shown in FIG. 3 can be served as the voltage value of the pixel voltage applied to the electrodes 142, 152 and 162 while the electrodes 144, 154, and 164 are applied by a common voltage or another fixed voltage, or reversed. In an example, the first gap g140 between the electrodes 142 and 144 in the first pixel unit 140 can be 5 μm, the second gap g150 between the electrodes 152 and 154 in the second pixel unit 150 can be 6.2 μm, and the third gap g160 between the electrodes 162 and 164 in the third pixel unit 160 can be 8.2 μm. In FIG. 3, the curves C1~C3 of the first display light L1, the second display light L2, and the third display light L3 substantially have similar tendency, which represents the wavelength dispersion is eliminated.

Figure 4:
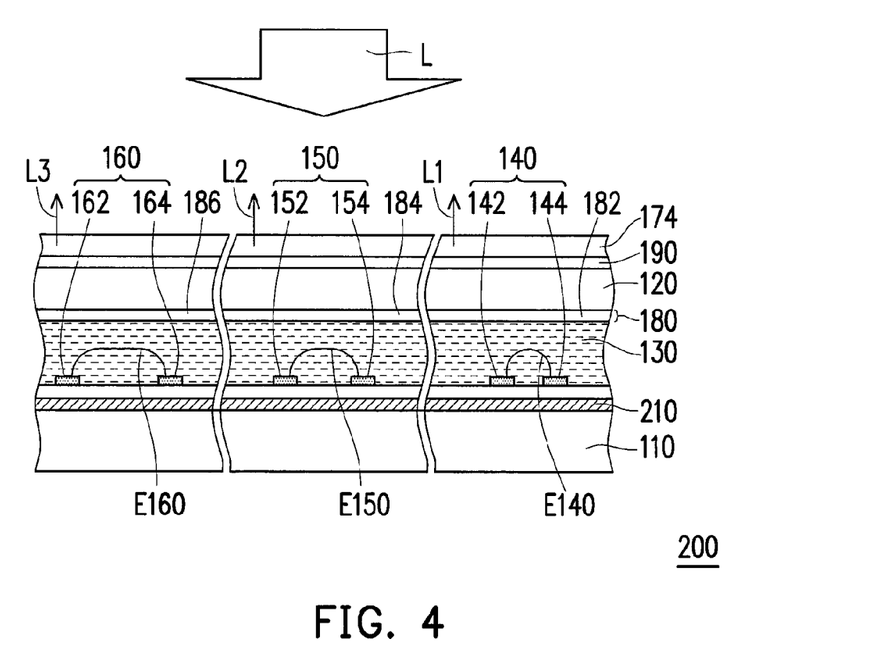
FIG. 4 is a schematic diagram illustrating a display panel according to another embodiment.

In the above embodiment, the display panel 100 can be a transmissive type, so that a backlight module can be disposed below the first substrate 110 to provide the white light L emitting toward the display panel 100. Nevertheless, the application is not limited thereto. The display panel 200 depicted in FIG. 4 is similar to the display panel 100 in FIG. 2. The same or similar elements in the two embodiments are denoted by the same reference numbers so that these elements are not reiterated here. The display panel 200 includes a first substrate 110, a second substrate 120, a liquid crystal layer 130, a first pixel unit 140, a second pixel unit 150, a third pixel unit 160, a second polarizer 174, a color filter layer 180, an optical retardation compensator 190, and a reflective layer 210.

In the present embodiment, the reflective layer 210 can be disposed between the first substrate 110 and the second substrate 120 and substantially formed on the first substrate 110. The incident light L passing the liquid crystal layer 130 can be reflected by the reflective layer 210 to construct a reflective type display design. The display panel 200 can be configured with only the second polarizer 174 on the second substrate 120, rather than two polarizers as depicted in FIG. 2. In addition, the optical retardation compensator 190 can be located between the second substrate 120 and the second polarizer 174. In an example, the incident light L can be provided by a front light module (not shown) or be an ambient light.

In the present embodiment, the first pixel unit 140, the second pixel unit 150 and the third pixel unit 160 have the design that the first gap between the electrodes 142 and 144 in the first pixel unit 140 is smaller than the second gap between the electrodes 152 and 154 in the second pixel unit 150, and the second gap between the electrodes 152 and 154 in the second pixel unit 150 is smaller than the third gap between the electrodes 162 and 164 of the third pixel unit 160. When the electrodes 142, 152 and 162 are applied by a first voltage and the electrodes 144, 154 and 164 are applied by a second voltage, the first electric field E140 can be greater than the second electric field E150 and the second electric field E150 can be greater than the third electric field E160, which is conducive to eliminate the wavelength dispersion. Therefore, the first display light L1, the second display light L2 and the third display light L3 with different colors can have similar V-T curves.

Figure 5A:
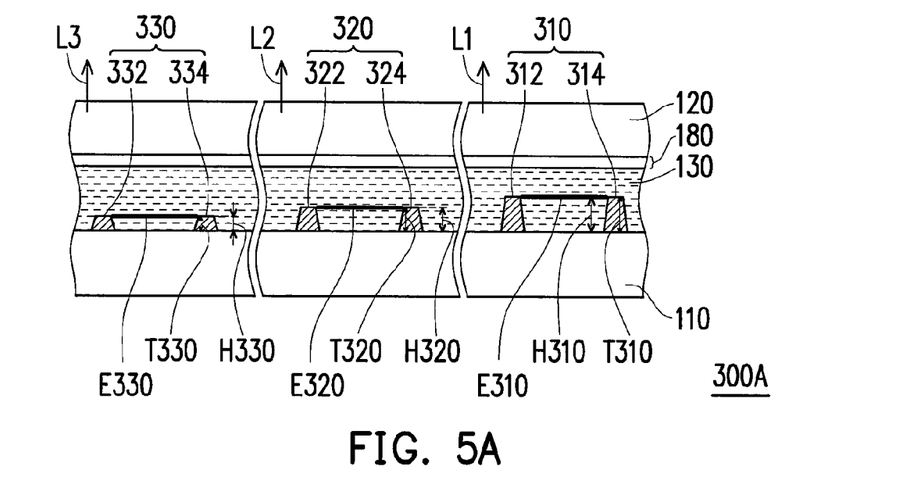
FIGS. 5A and 5B are schematic diagrams illustrating display panels according to another embodiment.

FIG. 5A is a schematic diagram illustrating a display panel according to another embodiment. Referring to FIG. 5A, the display panel 300A at least includes a first substrate 110, a second substrate 120, a liquid crystal layer 130, a color filter layer 180, a first pixel unit 310, a second pixel unit 320, and a third pixel unit 330. In the present embodiment, the design and the structure of the first substrate 110, the second substrate 120, the liquid crystal layer 130 and the color filter layer 180 are similar to the designs of the aforesaid embodiments and can be referred to the above descriptions. In addition, the display panel 300A, similar to the display panel 100, can further include two polarizers (not shown) disposed to sandwich the cell constructed by the first substrate 110, the liquid crystal layer 130 and the second substrate 120 therebetween. Alternately, the display panel 300A, similar to the display panel 200, can further include a reflective layer and one polarizer (not shown), in which the reflective layer can be disposed between the liquid crystal layer 130 and the first substrate 110 and the polarizer can be disposed on the second substrate 120.

In the present embodiment, the liquid crystal layer 130 driven by the first pixel unit 310 is used for controlling the transmittance of a first display light L1, the liquid crystal layer 130 driven by the second pixel unit 320 is used for controlling the transmittance of a second display light L2, and the liquid crystal layer 130 driven by the third pixel unit 330 is used for controlling the transmittance of a third display light L3. Herein, the display lights L1, L2 and L3 can be provided by a white light passing through the color filter layer 180 and the liquid crystal layer 130.

The liquid crystal layer 130 includes a plurality of optically isotropic liquid crystals, so that the wavelength dispersion may exist. The first pixel unit 310, the second pixel unit 320 and the third pixel unit 330 of the present embodiment can have the design as follows.

Referring to FIG. 5A, the first pixel unit 310, the second pixel unit 320 and the third pixel unit 330 respectively includes an electrode set of the electrodes 312 and 314 electrically independent from each other, an electrode set of the electrodes 322 and 324 electrically independent from each other, and an electrode set of the electrodes 332 and 334 electrically independent from each other. Top surfaces of the two electrodes 312 and 314 can be separated from the first substrate 110 by a first height H310, top surfaces of the two electrodes 322 and 324 can be separated from the first substrate 110 by a second height H320, and top surfaces of the two electrodes 332 and 334 can be separated from the first substrate 110 by a third height H330. Herein, the first height H310, the second height H320 and the third height H330 can be in a rage of greater than 0 μm to about 20 μm.

In general, the shapes of the electrodes have influence on the electric field formed by the electrodes. In one instance, a larger height of the electrode results in more significant electric field in the liquid crystal layer 130 under the same driving voltage set. For compensating the wavelength dispersion effect of the display panel 300A, the first height H310 can be greater than the second height H320 and the second height H320 can be greater than the third height H330 when the wavelength of the first display light L1 is greater than the wavelength of the second display light L2 and the wavelength of the second display light L2 is greater than the wavelength of the third display light L3. In such configuration, when a same first voltage is applied to the electrodes 312, 322 and 332 and a same second voltage different from the first voltage is applied to the electrodes 314, 324 and 334, a first electric field E310 in the liquid crystal layer 130 can be greater than a second electric field E320 in the liquid crystal layer 130 and the second electric field E320 in the liquid crystal layer 130 can be greater than a third electric field E330 in the liquid crystal layer 130. As such, the wavelength dispersion effect can be compensated by the first, second and third electric fields E310, E320 and E330, and the V-T curves of the first display light L1, the second display light L2 and the third display light L3 can have similar tendency. In other words, the electrodes can be configured to have a greater height with the increment of the displayed wavelength for compensating the inconsistence of the Kerr constant.

Figure 5B:
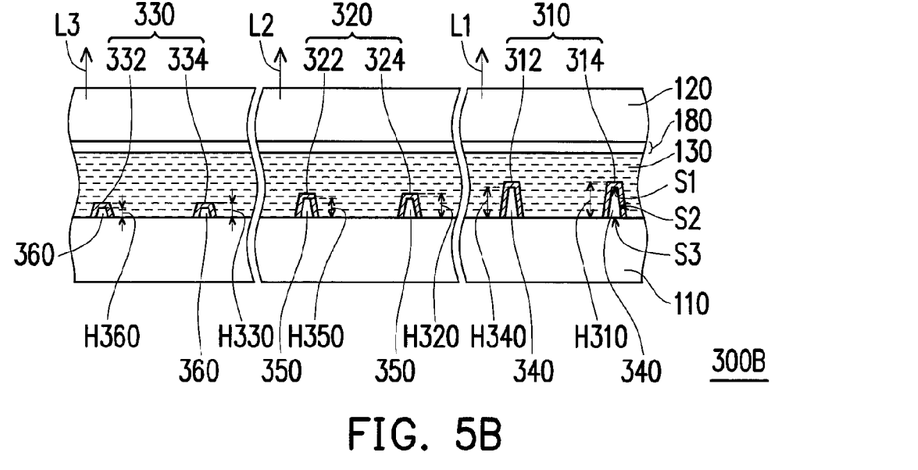

In an embodiment, the first thickness T310 of the electrodes 312 and 314, the second thickness T320 of the electrodes 322 and 324 and the third thickness T330 of the electrodes 332 and 334 can respectively be equivalent to the first height H310, the second height H320 and the third height H330. However, the disclosure is not limited hereto. For example, as shown in FIG. 5B, the display panel 300B having the most components of the display panel 300A can exemplarily further include first, second and third protruded parts 340, 350 and 360 protruded from the first substrate 110 toward the liquid crystal layer 130. Herein, the electrodes 312 and 314 of the first pixel unit 310 are formed to cover on the first protruded parts 340, the electrodes 322 and 324 of the second pixel unit 320 are formed to cover on the second protruded parts 350 and the electrodes 332 and 334 of the third pixel unit 330 are formed to cover on the third protruded parts 360.

In the present embodiment, each of the electrodes in the first pixel unit 310, the second pixel unit 320 and the third pixel unit 330 completely covers the top surface S1 and the side surface S2 of the corresponding one of the first, the second and the third protruded parts 340, 350 and 360. In an alternate embodiment, each of the electrodes in the first pixel unit 310, the second pixel unit 320 and the third pixel unit 330 can selectively partially cover the top surface S1 and the side surface S2 of the corresponding one of the first, the second and the third protruded parts 340, 350 and 360. In addition, the top surface S1 and the bottom surface S3 of each of the first, the second and the third protruded parts 340, 350 and 360 can have the same size or different sizes. Herein, the top surface S1 and the bottom surface S3 are exemplified as having different sizes so that the structure of the electrodes 312, 314, 322, 324, 332 and 334 can have a trapezoid shape cross-section, but the disclosure is not limited thereto.

The first, the second and the third heights H340, H350 and H360 of the first, the second and the third protruded parts 340, 350 and 360 can be in the range of greater than 0 μm to 20 μm and can be varied with the wavelength of the first display light L1, the second display light L2 and the third display light L3. In an example, the first height H340 can be greater than the second height H350 and the second height H350 can be greater than the third height H360 when the wavelength of the first display light L1 is greater than the wavelength of the second display light L2 and the wavelength of the second display light L2 is greater than the wavelength of the third display light L3. By the configuration of the first, the second and the third protruded parts 340, 350 and 360, the top surfaces of the electrodes can be separated from the first substrate 110 by different heights H310, H320 and H330 in the first pixel unit 310, the second pixel unit 320 and the third pixel unit 330 so that different electric field effect can be achieved.

Figure 6:
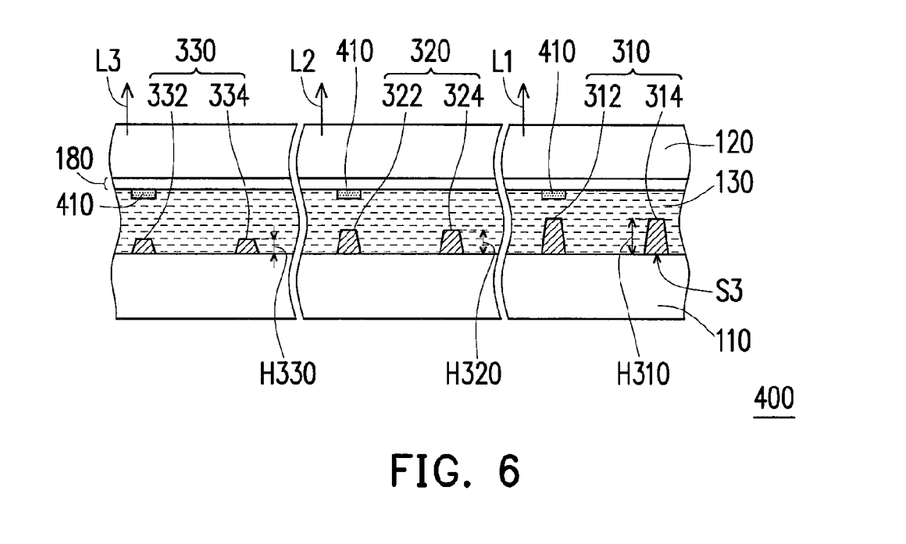
FIG. 6 is a schematic diagram illustrating a display panel according to another embodiment.

FIG. 6 is a schematic diagram illustrating a display panel according to another embodiment. Referring to FIG. 6, the display panel 400, similar to the display panel 300A, includes a first substrate 110, a second substrate 120, a liquid crystal layer 130, a color filter layer 180, a first pixel unit 310, a second pixel unit 320, and a third pixel unit 330 and these elements can be referred to the aforesaid embodiment and not reiterated here. In the present embodiment, each of the first electrode set in the first pixel unit 310, the second electrode set in the second pixel unit 320, and the third electrode set in the third pixel unit 330 further includes an opposite electrode 410 disposed between the first substrate 110 and the second substrate 120 and substantially formed on the second substrate 120. The opposite electrodes 410 can further guide the electric field formed in the liquid crystal layer 130, so that a vector of the electric field in the horizontal direction (parallel to the first substrate 110 or the second substrate 120 or non-parallel to the light incident direction of the light L incident to the liquid crystal layer) near the inner surface of the second substrate 120 can be enhanced, which conduces to contribute more to the overall performance of the liquid crystal layer 130. In an alternative embodiment, the opposite electrodes 410 can respectively located above the first gap between the electrodes 312 and 314, the second gap between the electrodes 322 and 324, and the third gap between the electrodes 332 and 334. However, the disclosure is not limited thereto.

Figure 7:
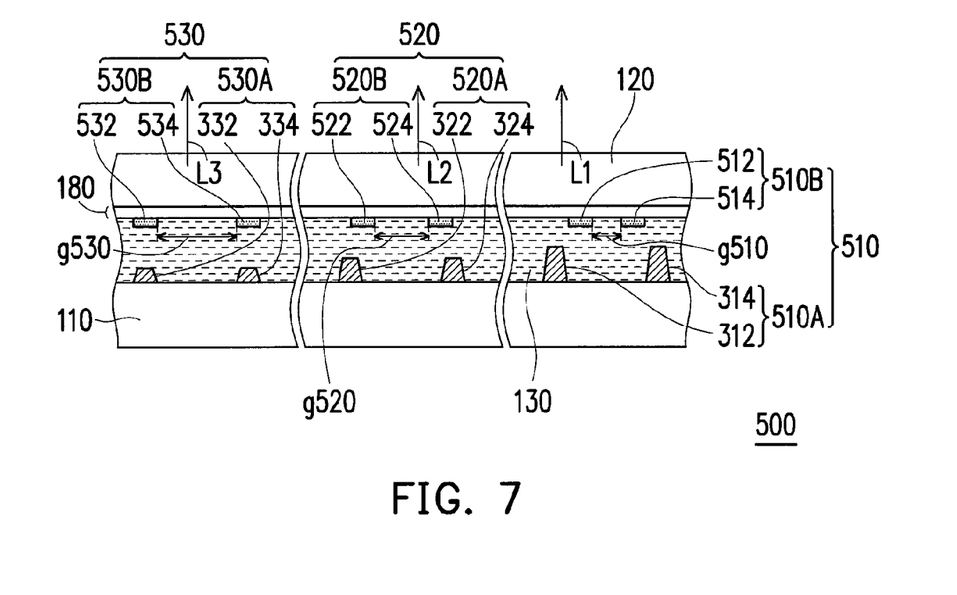
FIG. 7 is a schematic diagram illustrating a display panel according to another embodiment.

FIG. 7 is a schematic diagram illustrating a display panel according to further another embodiment. Referring to FIG. 7, the display panel 500, similar to the display panel 300A, includes a first substrate 110, a second substrate 120, a liquid crystal layer 130, a color filter layer 180, a first pixel unit 510, a second pixel unit 520, and a third pixel unit 530 and some of these elements having the identical reference numbers as those in the foregoing embodiments can be referred to the aforesaid embodiments and not reiterated here.

In the present embodiment, the first pixel unit 510 includes an electrode set 510A and a first opposite electrode set 510B, the second pixel unit 520 includes an electrode set 520A and a second opposite electrode set 520B, and the third pixel unit 530 includes an electrode set 530A and a third opposite electrode set 530B. The electrode set 510A in the first pixel unit 510 includes the electrodes 312 and 314 similar to those electrodes 312 and 314 depicted in the foregoing embodiments. The electrode set 520A in the second pixel unit 520 includes the electrodes 322 and 324 similar to those electrodes 322 and 324 depicted in the foregoing embodiments. The electrode set 530A in the third pixel unit 530 includes the electrodes 332 and 334 similar to those electrodes 332 and 334 depicted in the foregoing embodiments. Herein, the method for driving the electrode sets 510A, 520A and 530A can be similar to that for driving the electrode set 312 and 314, the electrode set 322 and 324 and the electrode set 332 and 334 depicted in the foregoing embodiments. The arrangement and the effect of the electrode sets 510A, 520A and 530A are conducive to eliminate the wavelength dispersion when the first display light L1, the second display light L2 and the third display light L3 have different wavelengths.

In the present embodiment, the first opposite electrode set 510B, the second opposite electrode set 520B and the third opposite electrode set 530B are formed on the second substrate 120 so as to be located between the second substrate 120 and the liquid crystal layer 130. The first opposite electrode set 510B includes the electrodes 512 and 514 electrically independent from each other. The second opposite electrode set 520B includes the electrodes 522 and 524 electrically independent from each other. The third opposite electrode set 530B includes the electrodes 532 and 534 electrically independent from each other.

The electrodes 512 and 514 are separated by a first gap g510, the electrodes 522 and 524 are separated by a second gap g520, and the electrodes 532 and 534 are separated by a third gap g530. In an embodiment, when the first display light L1, the second display light L2 and the third display light L3 have different wavelengths, the first gap g510, the second gap g520 and the third gap g530 can be different for achieving desirable V-T curves of the first display light L1, the second display light L2 and the third display light L3.

For example, when the wavelength of the first display light L1, the wavelength of the second display light L2 and the wavelength of the third display light L3 are configured in a relationship of larger, medium and smaller sequentially, the first gap g510, the second gap g520 and the third gap g530 can be configured in a relationship of smaller, medium and larger in sequence. When the display panel 500 displays an image, one of the electrodes 512 and 514, one of the electrodes 522 and 524, and one of the electrodes 532 and 534 can be applied by one of the pixel voltage and the common voltage while the other of the electrodes 512 and 514, the other of the electrodes 522 and 524, and the other of the electrodes 532 and 534 can be applied by the other of the pixel voltage and the common voltage. The electric fields formed in the liquid crystal layer 130 with respect to the first pixel unit 510, the second pixel unit 520 and the third pixel unit 530 may be in a relationship of larger, medium and smaller under the same driving voltage set. The V-T curves of the first, second and third display lights L1, L2 and L3 can have similar tendency, so as to eliminate the wavelength dispersion. In an alternative embodiment, the electrodes 512, 514, 522, 524, 532 and 534 can have the design similar to those depicted in FIG. 5A or FIG. 5B. That is, the electrodes 512 and 514 can respectively have a first thickness, the electrodes 522 and 524 can respectively have a second thickness, the electrodes 532 and 534 can respectively have a third thickness, and the first thickness, the second thickness and the third thickness can be different. Alternatively, the first, the second and the third protruded parts 340, 350 and 360 shown in FIG. 5B can be further disposed on the second substrate 120 and the electrodes 512, 514, 522, 524, 532 and 534 can be disposed on the first, the second and the third protruded parts 340, 350 and 360, such that the top surfaces of the electrodes 512 and 514 can be separated from the second substrate 120 by a first height, the top surfaces of the electrodes 522 and 524 can be separated from the second substrate 120 by a second height, the top surfaces of the electrodes 532 and 534 can be separated from the second substrate 120 by a third height, and the first height, the second height and the third height can be different.

In the present embodiment, the arrangement of the electrode sets 510A, 520A and 530A and the arrangement of the first opposite electrode set 510B, the second opposite electrode set 520B and the third opposite electrode set 530B are determined according to the first, second and third display lights L1, L2 and L3. Therefore, the consistency of the V-T curves with respect to the first, second and third display lights L1, L2 and L3 are improved.

Figure 8A:
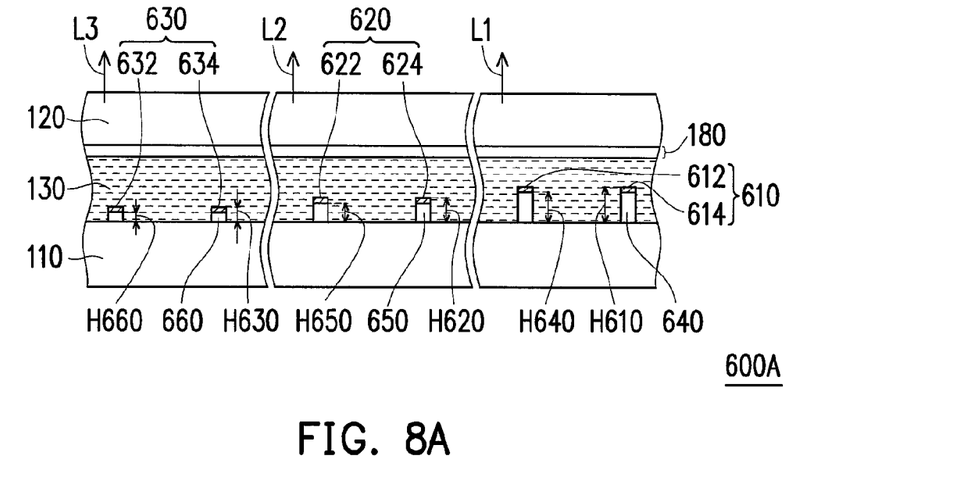
FIG. 8A and FIG. 8B are schematic diagrams illustrating a display panel according to another embodiment.
Figure 8B:
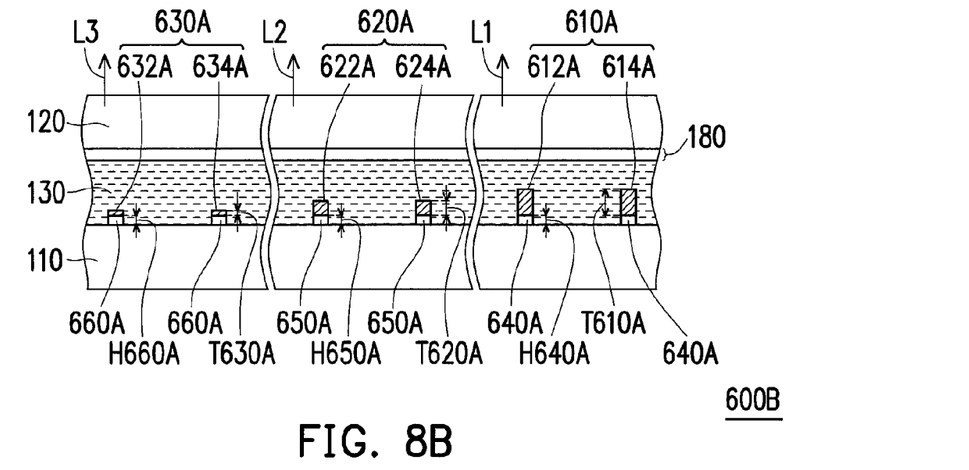

In the above embodiments, the structure design of the electrodes 312, 314, 322, 324, 332 and 334 have a trapezoid shape cross-section, but the disclosure is not limited thereto. FIG. 8A and FIG. 8B are schematic diagrams illustrating a display panel according to further another embodiment. Referring to FIG. 8A, the display panel 600A, similar to the display panel 300A, includes a first substrate 110, a second substrate 120, a liquid crystal layer 130, a color filter layer 180, a first pixel unit 610, a second pixel unit 620, a third pixel unit 630 and some of these elements having the identical reference numbers as those in the foregoing embodiments can be referred to the aforesaid embodiments and not reiterated here.

In the present embodiment, the first pixel unit 610 includes an electrode set of electrodes 612 and 614, the second pixel unit 620 includes an electrode set of electrode 622 and 624, and the third pixel unit 630 includes an electrode set of electrodes 632 and 634. The electrodes 612, 614, 622, 624, 632 and 634 are electrically independent from one another. In addition, the top surfaces of the electrodes 612 and 614 are separated from the first substrate 110 by a first height H610, the top surfaces of the electrodes 622 and 624 are separated from the first substrate 110 by a second height H620, and the top surfaces of the electrodes 632 and 634 are separated from the first substrate 110 by a third height H630. When the first, second and third display lights L1, L2 and L3 have different wavelengths, the first height H610, the second height H620 and the third height H630 can have different values so as to compensate the wavelength dispersion effect.

In an embodiment, the relationship of the first height H610, the second height H620 and the third height H630 can be referred to the design of the heights H310, H320 and H330 depicted in FIG. 5A, which is conducive to compensate the optical effect of the liquid crystal layer 130 with respect to different wavelengths by providing different electric field effect. In addition, the display panel 600A can further includes a plurality of first, second and third protruded parts 640, 650 and 660 formed on the first substrate 110 and the electrodes 612, 614, 622, 624, 632 and 634 can be formed on the tops of the first, second and third protruded parts 640、650 and 660 in a thin film manner so that the top surfaces of the electrodes 612, 614, 622, 624, 632 and 634 can be separated from the first substrate 110 by the required heights. In an alternate embodiment, the designs of the electrodes 612, 614, 622, 624, 632 and 634 and the first, second and third protruded parts 640, 650 and 660 can be used to replace the electrodes 312, 314, 322, 324, 332 and 332 in the above embodiments of FIGS. 6 and 7.

In the embodiment, the first, second and third protruded parts 640, 650 and 660 can be column structures having identical width but different heights. Specifically, the first protruded part 640 has the height H640, the second protruded part 650 has the height H650 and the third protruded part 660 has the height H660, wherein the height H640, the height H650 and the height H660 are gradually reduced comparing to the former one when the wavelengths of the first display light L1, the second display light L2 and the third display light L3 are gradually reduced first, the second and the third.

In another embodiment, as shown in FIG. 8B, the display panel 600B, similar to the display panel 600A, includes a first substrate 110, a second substrate 120, a liquid crystal layer 130, and a color filter layer 180. Herein, some of these elements having the identical reference numbers as those in the foregoing embodiments can be referred to the aforesaid embodiments and not reiterated here. In the display panel 600B, the first pixel unit 610A including the electrode set of the electrodes 612A and 614A, the second pixel unit 620A including the electrode set of the electrodes 622A and 624A, and the third pixel unit 630A including the electrode set of the electrodes 632A and 634A are disposed on the first substrate 110. In addition, the first, second and third protruded parts 640A, 650A and 660A are also disposed on the first substrate 110.

In the present embodiment, the electrodes 612A and 614A of the first pixel unit 610A are disposed on the tops of the first protruded parts 640A, the electrodes 622A and 624A of the second pixel unit 620A are disposed on the tops of the second protruded parts 650A, and the electrodes 632A and 634A of the third pixel unit 630A are disposed on the tops of the third protruded parts 660A. Herein, the heights H640A, H650A and H660A of the first, second and third protruded parts 640A, 650A and 660A are the same. Each of the electrodes 612A and 614A has the first thickness T610A greater than the second thickness T620A of each of the electrodes 622A and 624A, and the second thickness T620A of each of the electrodes 622A and 624A is greater than the third thickness T630A of each of the electrodes 632A and 634A. Though the first, second and third protruded parts 640A, 650A and 660A have the same height configuration, the top surfaces of the electrodes 612A and 614A, the top surfaces of the electrodes 622A and 624A, and the top surfaces of the electrodes 632A and 634A can be located at different heights from the first substrate 110 for providing the required electric field to drive the liquid crystal layer 130.

Figure 9:
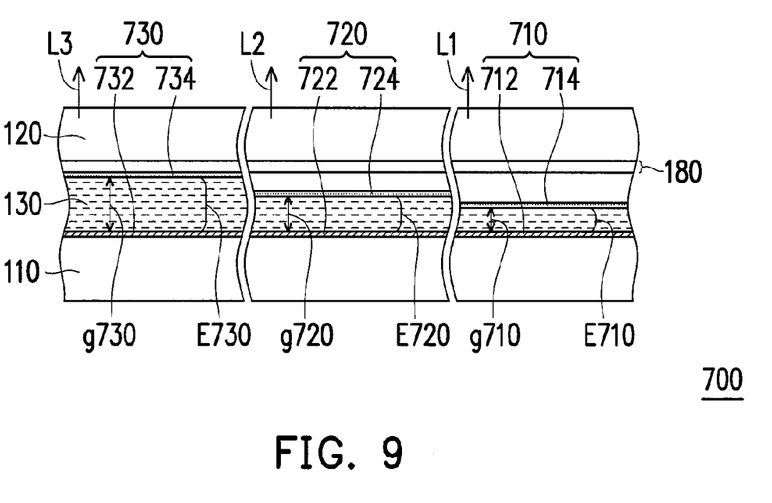
FIG. 9 is a schematic diagram illustrating a display panel according to further another embodiment.

FIG. 9 is a schematic diagram illustrating a display panel according to further another embodiment. Referring to FIG. 9, the display panel 700 includes a first substrate 110, a second substrate 120, a liquid crystal layer 130, a color filter layer 180, a first pixel unit 710, a second pixel unit 720, and a third pixel unit 730 and some of these elements having the identical reference numbers as those in the foregoing embodiments can be referred to the aforesaid embodiments and not reiterated here.

In the present embodiment, the first pixel unit 710 includes an electrode set of the electrodes 712 and 714, the second pixel unit 720 includes an electrode set of the electrodes 722 and 724, and the third pixel unit 730 includes an electrode set of the electrodes 732 and 734. The electrodes 712, 722 and 732 are formed on the first substrate 110 while the electrodes 714, 724 and 734 are formed on the second substrate 120. The electrodes 712 and 714 of the same electrode set are disposed at two opposite sides of the liquid crystal layer 130 and separated from each other by a first gap g710. The electrodes 722 and 724 of the same electrode set are disposed at two opposite sides of the liquid crystal layer 130 and separated from each other by a second gap g720. The electrodes 732 and 734 of the same electrode set are disposed at two opposite sides of the liquid crystal layer 130 and separated from each other by a third gap g730. In the present embodiment, a first electric field E710, a second electric field E720 and a third electric field E730 are substantially vertical directional so as to have a main vector substantially perpendicular to the first substrate 110, the second substrate 120, or both. Namely, the first electric field E710, the second electric field E720 and the third electric field E730 are vertical electric fields.

The first pixel unit 710, the second pixel unit 720 and the third pixel unit 730 are used for driving the liquid crystal layer 130 having a plurality of optically isotropic liquid crystals. In the embodiment, the first, second and third display lights L1, L2 and L3 corresponding to the first pixel unit 710, the second pixel unit 720 and the third pixel unit 730 have different wavelengths. For achieving a low wavelength dispersion effect, the first gap g710, the second gap g720 and the third gap g730 can be different. Herein, thickness of the liquid crystal layer 130 can be varied with the first gap g710, the second gap g720 and the third gap g730 so that the display panel 700 has multiple cell gaps.

In an embodiment, the first gap g710 can be smaller than the second gap g720 when the wavelength of the first display light L1 is greater than the wavelength of the second display light L2. Similarly, the second gap g720 can be smaller than the third gap g730 when the wavelength of the second display light L2 is greater than the wavelength of the third display light L3. Thereby, the first electric field E710 can be greater than the second electric field E720 when the electrodes 712 and 722 are applied by a same first voltage and the electrodes 714 and 724 are applied by a same second voltage. Similarly, the second electric field E720 can be greater than the third electric field E730 when the electrodes 722 and 732 are applied by a same first voltage and the electrodes 724 and 734 are applied by a same second voltage. The electric field variation can compensate the V-T curves of the first, second and third display lights L1, L2 and L3 to have similar tendency. In addition, to accumulate phase retardation, the incident direction of the incident light incident to the liquid crystal layer may not be in the normal direction, that is, the incident light can be obliquely incident so that a main vector of the first, second and third electric fields E710, E720 and E730 directs in a direction that is substantially non-parallel to the light incident direction.

According to above embodiments, the display panels can have a transmissive type design or have a reflective type design. Once the reflective type design is adopted, the display panel can be configured with a reflective layer between the first substrate and the liquid crystal layer as well as one polarizer over the second substrate. Herein, the electrodes in the same electrode set do not have to both be disposed on the first substrate 110, and they can be distributed either on the first substrate 110, the second substrate 120 or on both the first and second substrates 110 and 120. In addition, the shape and the gap of the electrodes in the same electrode set of each pixel unit or within the same pixel unit don't have to be the same. For example, electrodes of the same electrodes set could take the forms from followings:

1) Electrodes of the same electrodes set with or without covering on the protruded part could be formed in the shapes as shown in FIGS. 5A, 5B, 8A and 8B. The top width (away from the substrate), the bottom width (near to the substrate) and the height of the protruded parts may be the same or different. The top width can be 0.2 μm to 100 μm, the bottom width can be 0.2 μm to 100 μm, and the height can be greater than 0 μm to 20 μm. The electrodes of the same electrode set can be coated on the top surfaces of the protruded parts or only part or all of the side surfaces of the protruded parts. The electrodes can be made of metal such as aluminium or transparent conductive material such as indium-tin oxide (ITO).

2) The electrode with or without covering on the protruded part could have a rectangular shape as shown in FIG. 8A and FIG. 8B, with a width, and a protruded height; the width can be 0.2 μm to 100 μm, and the protruded height can be greater than 0 μm to 20 μm.

3) For the electrode with the protruded part, the protruded part can be part of the substrate and can be obtained by etching, photolithography, or the like methods performed on the substrate; the protruded part can also be an insulating layer on top of a surface of the substrate, this insulating protruded part can be made by organic transparent materials, or the like materials.

4) Electrodes of the same electrode set could also be in the shape of protruded parts, and could have any other shapes such as triangular, polygonal and semicircular, rather than limited to the shapes shown in the above figures, where the entire protruded parts (the entire electrodes) are made of metal such as aluminium or transparent conductive material such as ITO. In this case, the electrodes can be formed on the surface of the substrate, and the additional protruded part will not be needed.

In the foregoing embodiments, the display panels 100, 300A, 300B, 400, 500, 600A, 600B and 700 can be equipped with a pair of polarizers (such as the first and the second polarizers 172 and 174 depicted in FIG. 2) sandwiching the cell constructed of the first substrate 110, the liquid crystal layer 130 and the second substrate 120 therebetween. Furthermore, in an embodiment, a compensation film (such as the optical retardation compensator 190 depicted in FIG. 2) can be further disposed between the pair of polarizers, in which the compensation film can be uniaxial films. It can also be a biaxial film with $Nz=(n_x-n_z)/(n_x-n_y)=0.5$, and in plane retardation $d\times(n_x-n_y)=\lambda/2$. Here, $n_x$, $n_y$, and $n_z$ denote the refractive indices of the biaxial film, d is the thickness of the film, and $\lambda$ is the wavelength of interest. To achieve wide view effect, the $n_x$ axis of the compensation film is placed parallel to the absorption axis of the top linear polarizer (such as the second polarizer 174 depicted in FIG. 2). Besides, using zigzag electrode structures could greatly reduce the color shift.

In light of foregoing, the display panel having different electrode designs in different pixel units corresponds to the wavelength of the display light. Therefore, the wavelength dispersion effect can be compensated so as to have desirable display quality.

It will be apparent to those skilled in the art that various modifications and variations can be made to the structure of the disclosed embodiments without departing from the scope or spirit of the disclosure. It is intended that the disclosure cover modifications and variations of this disclosure provided they fall within the scope of the following claims and their equivalents.

What is claimed is:

1. A display panel comprising:
a first substrate;
a second substrate opposite to the first substrate;
a liquid crystal layer interposed between the first substate and the second substrate, and comprising a plurality of optically isotropic liquid crystals;
a color filter layer disposed between the liquid crystal layer and the second substrate;

at least a first pixel unit disposed between the first substrate and the second substrate to form a first electric field in the liquid cyrstal layer and the first pixel unit comprising a first electrode set;

at least a second pixel unit disposed between the first substrate and the second substrate to form a second electric field in the liquid cyrstal layer and the second pixel unit comprising a second electrode set; and at least a third pixel unit disposed between the first substrate and the second substrate to form a third electric field in the liquid cyrstal layer, and the third pixel unit comprising a third electrode set, wherein each of the first electrode set, the second electrode set, and the third electrode set comprises two electrodes electrically independent from each other and the two electrodes in each of the first electrode set, the second electrode set, and the third electrode set are disposed respectively on the first substrate and the second substrate, each of the first electric field, the second electric field and the third electric field has a main vector substantially vertical to the first substrate or the second substrate, and a direction of the main vector is substantially non-parallel to a light incident direction of the light incident to the liquid crystal layer, wherein a first display light displayed by the first pixel unit, a second display light displayed by the second pixel unit, and a third display light displayed by the third pixel unit have different wavelengthes, and the first electric field, the second electric field and the third electric field are different when the first electrode set, the second electrode set and the third electrode set are applied by a same driving voltage set, wherein the first electric field is greater than the second electric field and the second electric field is greater than the third electric field when the the wavelength of the first display light is greater than the wavelength of the second display light, and the wavelength of the second display light is greater than the wavelength of the third display light.

2. The display panel according to claim 1, wherein a gap between the two electrodes is in a range of greater than 0 μm to 100 μm.

3. The display panel according to claim 2, wherein the two electrodes of the first electrode set are separated by a first gap, the two electrodes of the second electrode set are separated by a second gap, the two electrodes of the third electrode set are separated by a third gap, and the first gap, the second gap and the third gap are different.

4. The display panel according to claim 1, wherein the first display light, the second display light and the third display light are respectively a red light, a green light and a blue light.

5. The display panel according to claim 1, wherein the optically isotropic liquid crystals comprises a plurality of blue-phase liquid crystals, a plurality of polymer-stabilized isotropic phase liquid crystals, or a combination thereof.

6. The display panel according to claim 1, further comprising a first polarizer and a second polarizer, wherein the first substrate, the liquid crystal layer, and the second substrate are sandwiched between the first polarizer and the second polarizer.

7. The display panel according to claim 6, further comprising an optical retardation compensator located between the first polarizer and the second polarizer.

8. The display panel according to claim 1, wherein the driving voltage set comprises a pixel voltage and a common voltage.

9. The display panel according to claim 1, further comprising a reflective layer and a polarizer, wherein the reflective layer is disposed between the liquid crystal layer and the first substrate and the polarizer is disposed on the second substrate.

10. The display panel according to claim 9, further comprising an optical retardation compensator located between the polarizer and the second substrate.

11. A display panel comprising:
a first substrate;
a second substrate opposite to the first substrate;
a liquid crystal layer interposed between the first substate and the second substrate, and comprising a plurality of optically isotropic liquid crystals;
a color filter layer disposed between the liquid crystal layer and the second substrate;
at least a first pixel unit disposed between the first substrate and the second substrate to form a first electric field in the liquid cyrstal layer and the first pixel unit comprising a first electrode set;
at least a second pixel unit disposed between the first substrate and the second substrate to form a second electric field in the liquid cyrstal layer and the second pixel unit comprising a second electrode set; and
at least a third pixel unit disposed between the first substrate and the second substrate to form a third electric field in the liquid cyrstal layer, and the third pixel unit comprising a third electrode set, wherein the first pixel unit further comprises a first opposite electrode set, the second pixel unit further comprises a second opposite electrode set, the third pixel unit further comprises a third opposite electrode set, in which the first electrode set and the first opposite electrode set are respectively disposed on the first substate and the second substrate, the second electrode set and the second opposite electrode set are respectively disposed on the first substate and the second substrate, and the third electrode set and the third opposite electrode set are respectively disposed on the first substate and the second substrate, wherein each of the first electrode set, the second electrode set, and the third electrode set comprises two electrodes electrically independent from each other, and each of the first opposite electrode set, the second opposite electrode set and the third opposite electrode set comprises two opposite electrodes electrically independent from each other, wherein the two opposite electrodes of the first opposite electrode set are separated by a first gap, the two opposite electrodes of the second opposite electrode set are separated by a second gap, the two opposite electrodes of the third opposite electrode set are separated by a third gap, the first gap, the second gap and the third gap are different, top surfaces of the two electrodes of the first electrode set are separated from the first substrate by a first height, top surfaces of the two electrodes of the second electrode set are separated from the first substrate by a second height, top surfaces of the two electrodes of the third electrode set are separated from the first substrate by a third height, and the first height, the second height and the third height are different, wherein the electrode set corresponding to the highest height among the first height, the second height and the third height is disposed at the same pixel unit as the opposite electrode set corresponding to the smallest gap among the first gap, the second gap and the third gap, and wherein a first display light displayed by the first pixel unit, a second display light displayed by the second pixel unit, and a third display light displayed by the third pixel unit have different wavelengthes, and the first electric field, the second electric field and the third electric field are different when the first electrode set, the second electrode set and the third electrode set are applied by a same driving voltage set.

12. The display panel according to claim 11, wherein the first electric field is greater than the second electric field and the second electric field is greater than the third electric field when the the wavelength of the first display light is greater than the wavelength of the second display light, and the wavelength of the second display light is greater then the wavelength of the third display light.

13. The display panel according to claim 11, wherein the first display light, the second display light and the third display light are respectively a red light, a green light and a blue light.

14. The display panel according to claim 11, wherein the optically isotropic liquid crystals comprises a plurality of blue-phase liquid crystals, a plurality of polymer-stabilized isotropic phase liquid crystals, or a combination thereof.

15. The display panel according to claim 11, further comprising a first polarizer and a second polarizer, wherein the first substrate, the liquid crystal layer, and the second substrate are sandwiched between the first polarizer and the second polarizer.

16. The display panel according to claim 14, further comprising an optical retardation compensator located between the first polarizer and the second polarizer.

17. The display panel according to claim 11, wherein each of the first electric field, the second electric field and the third electric field has a main vector in a direction that is substantially non-parallel to a light incident direction of the light incident to the liquid crystal layer.

18. The display panel according to claim 11, wherein the driving voltage set comprises a pixel voltage and a common voltage.

19. The display panel according to claim 11, further comprising a reflective layer and a polarizer, wherein the reflective layer is disposed between the liquid crystal layer and the first substrate and the polarizer is disposed on the second substrate.

20. The display panel according to claim 18, further comprising an optical retardation compensator located between the polarizer and the second substrate.

21. The display panel according to claim 11, wherein the first height, the second height and the third height are respectively in a range of greater than 0 μm to 20 μm.

22. The display panel according to claim 21, further comprising a plurality of first protruded parts, a plurality of second protruded parts and a plurality of third protruded parts disposed on the first substrate, wherein the electrodes of the first electrode set are disposed on the first protruded parts, the electrodes of the second electrode set are disposed on the second protruded parts, the electrodes of the third electrode set are disposed on the third protruded parts, and the first protruded parts, the second protruded parts and the third protruded parts have different thicknesses or have the same thickness.

23. The display panel according to claim 22, wherein a top surface of each of the first protruded parts, the second protruded parts and the third protruded parts is smaller than or substantially the same with a bottom surface of each of the first protruded parts, the second protruded parts and the third protruded parts.

24. The display panel according to claim 22, wherein a width of each of the first protruded parts, the second protruded parts and the third protruded parts is identical or different.

25. The display panel according to claim 11, wherein a first thickness of each electrode of the first electrode set, a second thickness of each electrode of the second electrode set and a third thickness of each electrode of the third electrode set are different and are in a range of greater than 0 μm to 20 μm.

* * * * *